US010650564B1

(12) United States Patent
Lin et al.

(10) Patent No.: US 10,650,564 B1
(45) Date of Patent: May 12, 2020

(54) METHOD OF GENERATING 3D FACIAL MODEL FOR AN AVATAR AND RELATED DEVICE

(71) Applicant: XRSpace CO., LTD., Taoyuan (TW)

(72) Inventors: Ting-Chieh Lin, New Taipei (TW); Shih-Chieh Chou, Taipei (TW)

(73) Assignee: XRSpace CO., LTD., Taoyuan (TW)

( * ) Notice: Subject to any disclaimer, the term of this patent is extended or adjusted under 35 U.S.C. 154(b) by 0 days.

(21) Appl. No.: 16/389,984

(22) Filed: Apr. 21, 2019

(51) Int. Cl.
| G06K 9/00 | (2006.01) |
| G06T 13/40 | (2011.01) |
| G06T 17/20 | (2006.01) |
| G06K 9/62 | (2006.01) |
| G06N 3/04 | (2006.01) |

(52) U.S. Cl.
CPC .......... *G06T 13/40* (2013.01); *G06K 9/00281* (2013.01); *G06K 9/00288* (2013.01); *G06K 9/6267* (2013.01); *G06N 3/04* (2013.01); *G06T 17/20* (2013.01)

(58) Field of Classification Search
None
See application file for complete search history.

(56) References Cited

U.S. PATENT DOCUMENTS

| 7,436,988 | B2 * | 10/2008 | Zhang | G06K 9/00268 |
| | | | | 382/118 |
| 8,306,285 | B2 * | 11/2012 | Ito | G06K 9/00281 |
| | | | | 382/118 |
| 9,886,640 | B1 * | 2/2018 | Chen | G06K 9/00906 |
| 10,579,876 | B2 * | 3/2020 | Tang | G06N 3/0454 |
| 2004/0208387 | A1 * | 10/2004 | Gondek | H04N 1/62 |
| | | | | 382/254 |
| 2004/0208388 | A1 * | 10/2004 | Schramm | G06T 5/002 |
| | | | | 382/254 |
| 2005/0180612 | A1 * | 8/2005 | Nagahashi | G06K 9/00248 |
| | | | | 382/118 |
| 2006/0257039 | A1 * | 11/2006 | Matsuhira | G06K 9/00241 |
| | | | | 382/254 |
| 2014/0063236 | A1 * | 3/2014 | Shreve | G06K 9/00228 |
| | | | | 348/143 |
| 2016/0284121 | A1 * | 9/2016 | Azuma | H04N 7/157 |
| 2017/0053156 | A1 * | 2/2017 | Chen | G06K 9/00234 |
| 2017/0109571 | A1 * | 4/2017 | McDuff | G06K 9/00302 |
| 2017/0286752 | A1 * | 10/2017 | Gusarov | G06T 13/40 |
| 2018/0158240 | A1 * | 6/2018 | Saito | G06K 9/00228 |

(Continued)

OTHER PUBLICATIONS

Shunsuke Saito et al., Photorealistic Facial Texture Inference Using Deep Neural Networks, Dec. 2, 2016, pp. 1-14, XP080736219.

(Continued)

*Primary Examiner* — Martin Mushambo
(74) *Attorney, Agent, or Firm* — Winston Hsu

(57) ABSTRACT

A method of generating 3D facial geometry for a computing device is disclosed. The method comprises obtaining a 2D image, performing a deep neural network, DNN, operation on the 2D image, to classify each of facial features of the 2D image as texture components and obtain probabilities that the facial feature belong to the texture components, wherein the texture components are represented by 3D face mesh and are predefined in the computing device, and generating a 3D facial model based on a 3D face template predefined in the computing device and the texture component with the highest probability.

21 Claims, 5 Drawing Sheets

(56) References Cited

U.S. PATENT DOCUMENTS

2018/0190377 A1* 7/2018 Schneemann ......... G06N 3/084
2018/0374242 A1* 12/2018 Li ......................... G06T 15/04

OTHER PUBLICATIONS

Anh Tuân Trân et al., Regressing Robust and Discriminative 3D Morphable Models with a very Deep Neural Network, Dec. 15, 2016, XP080744430.

W.N.Widanagamaachchi et al., 3D Face Reconstruction from 2D Images A Survey, Digital Image Computing: Techniques and Applications, 2008 IEEE, pp. 365-371, XP031371900.

* cited by examiner

1.

2.

3.

4.

5.

6.

7.

METHOD OF GENERATING 3D FACIAL MODEL FOR AN AVATAR AND RELATED DEVICE

BACKGROUND OF THE INVENTION

1. Field of the Invention

The present disclosure relates to 3D facial reconstruction, and more particularly, to a method of generating 3D facial model from a single 2D image for games and simulations.

2. Description of the Prior Art

Reconstruction of 3D facial model using 2D image is an ongoing challenge for game immersion and simulation design. For example, users want to feel as though the avatars that they see on screen are themselves and that the experiences of their avatars are their own. To that end, much work has been done in the area of 3D facial reconstruction for the purpose of inserting one's own likeness into a game or simulation. However, most existing methods require a minimum of two images and complex computations to produce the 3D facial model.

In the past, a number of methods have been proposed for face reconstruction using a single image. Among them, example-based methods first build a low-dimensional parametric representation of 3D face models from an example set, and then fit the parametric model to the input 2D image. One of the most well-known examples is the 3D morphable model (3DMM) applied with convolutional neural network (CNN). 3DMM is a popular parametric face model due to its simplicity, and has been the foundation of other more sophisticated face reconstruction methods. However, such methods cannot generate faces with individual characteristics and can only be used for face recognition under specific conditions. In addition, a lack of adequate training data is a big problem in CNN, and thus it gets a shallow residual network.

Another approach to single image reconstruction is to solve it as shape from shading (SFS), a classical computer vision problem of 3D shape recovery from shading variation. For example, Kemelmacher-Shlizerman and Basri reconstruct the depth information from an input face image, by estimating its lighting and reflectance parameters using a reference face shape. While these existing approaches are able to produce high quality reconstruction from a single image, they also come with limitations.

Although 3DMM method is simple and efficient, it may produce unsatisfactory results when the target face is largely different from those in the example set. Moreover, due to the limited degrees of freedom of the low-dimensional model, this method often fails to reproduce fine geometric details (such as wrinkles) that are specific to the target face. On the other hand, SFS-based method is able to capture the fine-scale facial details from the appearance of the input image. However, it requires prior knowledge about the geometry or illumination to resolve the ambiguity of the reconstruction problem, and may become inaccurate when the input image does not satisfy the assumptions.

SUMMARY OF THE INVENTION

It is therefore an objective to provide a method of generating 3D facial model for an avatar to solve the above problem.

The present disclosure discloses a method of generating 3D facial geometry fora computing device. The method comprises obtaining a 2D image, performing a landmark detection operation on the 2D image, to obtain at least a facial feature with landmarks, determining weightings for a plurality of classifications of the facial feature based on relative distances of the landmarks, wherein the plurality of classifications are predefined in the computing device, performing a deep neural network, DNN, operation on the 2D image, to classify each of facial features of the 2D image as texture components and obtain probabilities that the facial feature belong to the texture components, wherein the texture components are represented by 3D face mesh and are predefined in the computing device, and generating a 3D facial model based on a 3D face template predefined in the computing device with 3D parameters corresponding to the plurality of classifications of the facial feature, the corresponding weightings, and the texture component with the highest probability.

The present disclosure discloses an avatar simulation system. The avatar simulation system comprises a camera, for obtaining a 2D image, a computing device or a cloud, for generating 3D facial model, wherein the computing device or the cloud includes a processing unit for executing a program, and a storage unit coupled to the processing unit for storing the program, wherein the program instructs the processing unit to perform the following steps: obtaining a 2D image, performing a landmark detection operation on the 2D image, to obtain at least a facial feature with landmarks, determining weightings for a plurality of classifications of the facial feature based on relative distances of the landmarks, wherein the plurality of classifications are predefined in the computing device, performing a deep neural network, DNN, operation on the 2D image, to classify each of facial features of the 2D image as texture components and obtain probabilities that the facial feature belong to the texture components, wherein the texture components are represented by 3D face mesh and are predefined in the computing device, and generating a 3D facial model based on a 3D face template predefined in the computing device with 3D parameters corresponding to the plurality of classifications of the facial feature, the corresponding weightings, and the texture component with the highest probability.

The present disclosure discloses a computing device for generating 3D facial geometry for an avatar. The computing device comprises a processing unit for executing a program, and a storage unit coupled to the processing unit for storing the program, wherein the program instructs the processing unit to perform the following steps: obtaining a 2D image, performing a landmark detection operation on the 2D image, to obtain at least a facial feature with landmarks, determining weightings for a plurality of classifications of the facial feature based on relative distances of the landmarks, wherein the plurality of classifications are predefined in the computing device, performing a deep neural network, DNN, operation on the 2D image, to classify each of facial features of the 2D image as texture components and obtain probabilities that the facial feature belong to the texture components, wherein the texture components are represented by 3D face mesh and are predefined in the computing device, and generating a 3D facial model based on a 3D face template predefined in the computing device with 3D parameters corresponding to the plurality of classifications of the facial feature, the corresponding weightings, and the texture component with the highest probability.

These and other objectives of the present invention will no doubt become obvious to those of ordinary skill in the art

DETAILED DESCRIPTION

Figure 1:
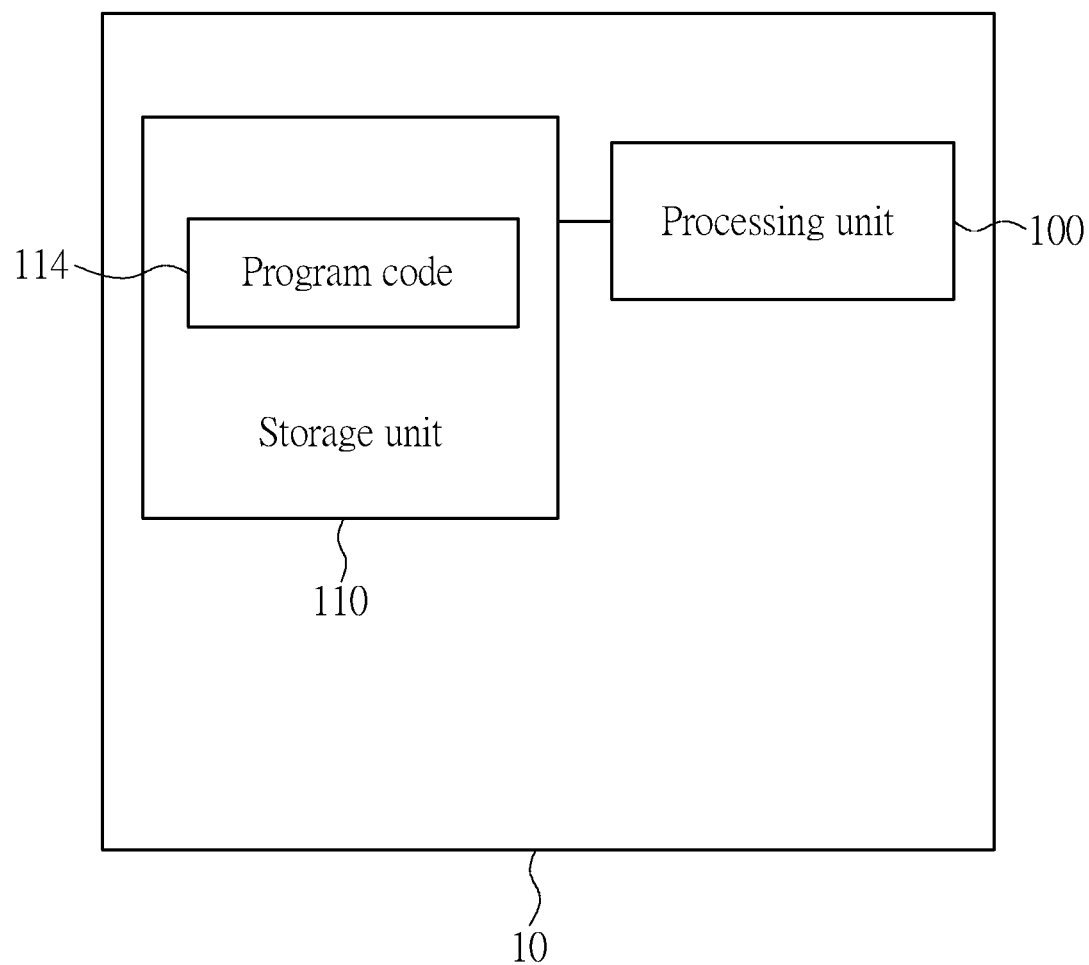
FIG. 1 is a schematic diagram of a 3D facial geometry generating device according to one embodiment of the present disclosure.

FIG. 1 is a schematic diagram of a 3D facial geometry generating device 10 according to one embodiment of the present disclosure. The 3D facial geometry generating device 10 may be a local computing device or a cloud, and includes a processing unit 100, such as a microprocessor or Application Specific Integrated Circuit (ASIC), a storage unit 110 and a communication interfacing unit 120. The storage unit 110 may be any data storage device that can store a program code 114, for access by the processing unit 100. Examples of the storage unit 110 include but are not limited to a subscriber identity module (SIM), read-only memory (ROM), flash memory, random-access memory (RAM), CD-ROMs, magnetic tape, hard disk, and optical data storage device. The communication interfacing unit 120 is applied with a wire or wireless communication for exchange signals with a camera and/or a display device (not shown in FIG. 1) according to processing results of the processing unit 100. In other words, the communication interfacing unit 120 of the 3D facial geometry generating device 10 is used for receiving a 2D image from the camera and may be used for transmitting the generated 3D facial model to the display device. Thus, the display device could display the avatar with the generated 3D facial model, to increase the VR immersion. In an embodiment, the camera, display device and the 3D facial geometry generating device 10 as the local computing device or the cloud form an avatar simulation system.

Figure 2:
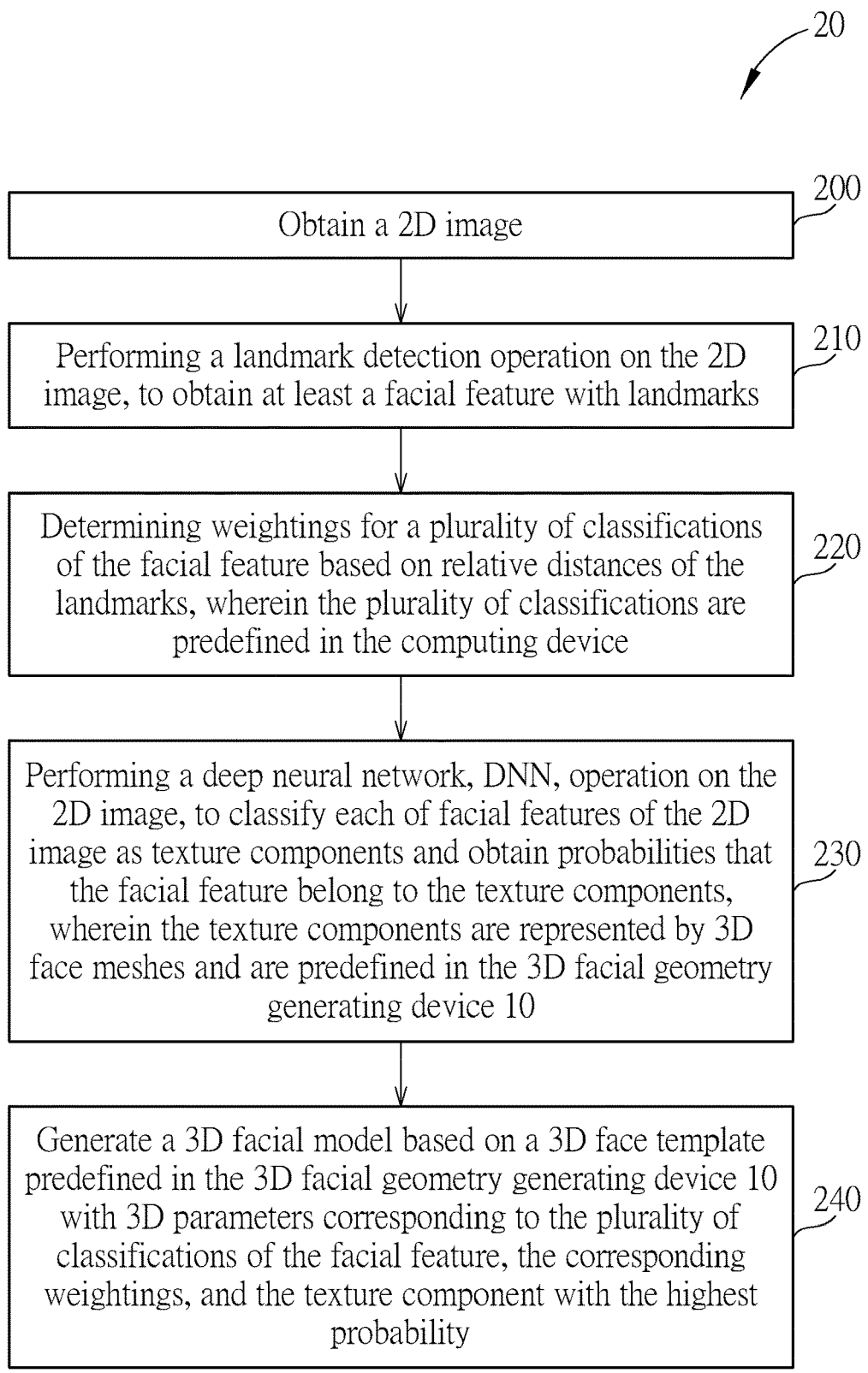
FIG. 2 is a flowchart according to an embodiment of the present disclosure.

Reference is made to FIG. 2. A flowchart of a process 20 according to an embodiment of the present disclosure is illustrated. The process 20 could be utilized in the 3D facial geometry generating device 10 of FIG. 1 for generating 3D facial model based on a single 2D image for games (e.g. a VR game) and simulations (e.g. an avatar). The process 20 may be compiled into a program code 114 to be stored in the storage unit 110, and may include the following steps:

Step 200: Obtain a 2D image.

Step 210: Performing a landmark detection operation on the 2D image, to obtain at least a facial feature with landmarks.

Step 220: Determining weightings for a plurality of classifications of the facial feature based on relative distances of the landmarks, wherein the plurality of classifications are predefined in the computing device.

Step 230: Performing a deep neural network, DNN, operation on the 2D image, to classify each of facial features of the 2D image as texture components and obtain probabilities that the facial feature belong to the texture components, wherein the texture components are represented by 3D face meshes and are predefined in the 3D facial geometry generating device 10.

Step 240: Generate a 3D facial model based on a 3D face template predefined in the 3D facial geometry generating device 10 with 3D parameters corresponding to the plurality of classifications of the facial feature, the corresponding weightings, and the texture component with the highest probability.

According to the process 20, the 3D facial geometry generating device 10 may receive a 2D image from the camera by the communication interfacing unit 120, from the storage unit 110 pre-storing multiple 2D images, or from a database on the internet/website, and then generates the 3D facial model for the avatar based on the 2D image with landmark detection operation and DNN operation.

In detail, the 3D facial geometry generating device 10 extracts facial features, such as face, eye, nose, and mouth by landmarks on the 2D image, so as to recognize classifications of each facial shape (e.g. face shape, eye shape, nose shape, and mouth shape). In an embodiment, classifications of each facial shape are predefined or designed in the application/software. For example, the face shape could be classified into round face, square face, long face, heart face, diamond face, or oval face, but is not limited herein. Note that, for each face shape type/classification, the designer configures 3D parameters associated to geometry of the face shapes. In other words, each face shape type/classification is represented by a 3D parameter. Note that, the 3D parameter in this article may be a set of parameters corresponding to curve of a chin width and length, but is not limited herein. Similarly, eyes, nose and mouth are classified into multiple types.

Based on the classifications of the facial features, the 3D facial geometry generating device 10 determines the weights for each classification of a facial feature via artificial intelligence (AI)/machine learning technology. For example, there are 6 types of face shape, such as round face, square face, long face, heart face, diamond face, or oval face, and these face shapes are represented as 3D parameters T1-T6 in the following equation. With application of AI/machine learning technology, the 3D facial geometry generating device 10 can calculate the probability that the landmark face shape belongs to the 6 face types, so as to determine weights, which is represented as W1-W6 in the following equation, for the 6 face types based on the probability. The 3D face shape is expressed by:

3D facial model=$S_0$+T1W1+T2W2 . . . +T6W6, wherein $S_0$ is 3D face shape template.

The abovementioned concept could be applied for the eyes, nose and mouth, so as to generate the 3D facial model based on facial shapes for the avatar.

Meanwhile, the 3D facial geometry generating device 10 extracts facial features by the DNN operation, and therefore the facial features of the 2D image are represented not only by shapes but also by the texture components, such as an eyebrow texture, a facial hair texture, a hair style, and morph target, eye bags, lip color, hair color, etc. Moreover, the DNN operation is able to calculate the probability that the facial features belongs to the texture components. In other words, the DNN operation is used for determining whether a texture component appears.

Figure 3:
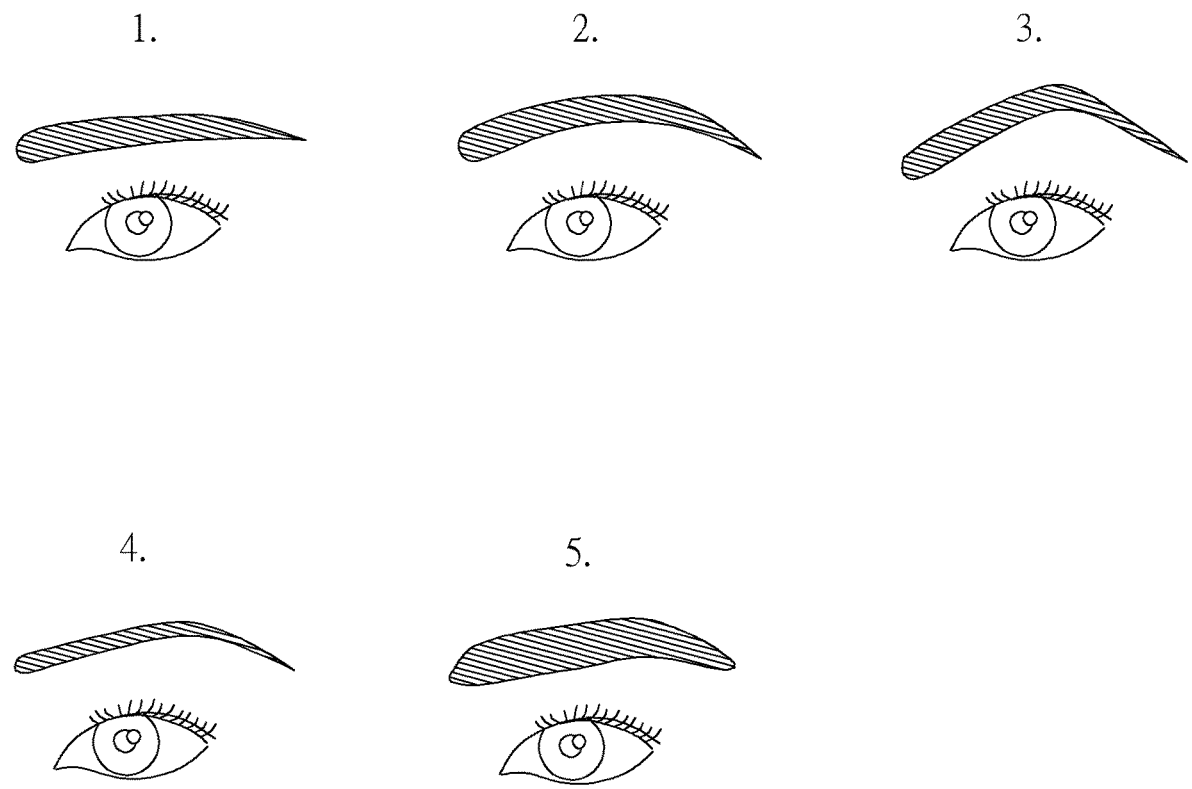
FIGS. 3-4 are schematic diagrams of texture components according to an embodiment of the present disclosure.
Figure 4:
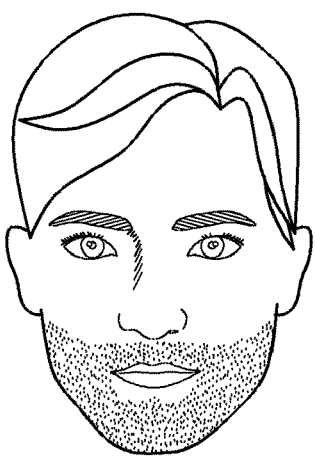
Figure 4:
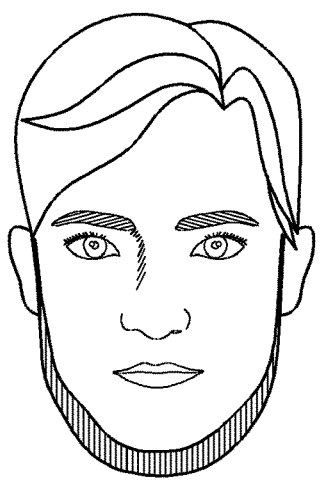
Figure 4:
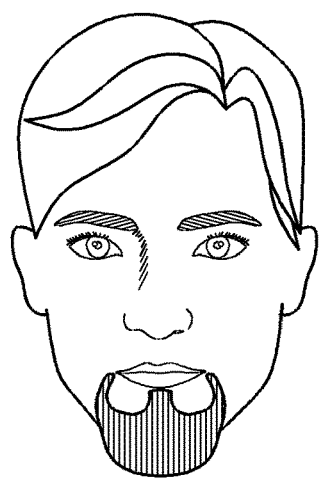
Figure 4:
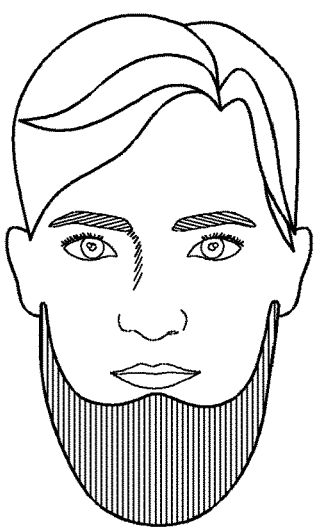
Figure 4:
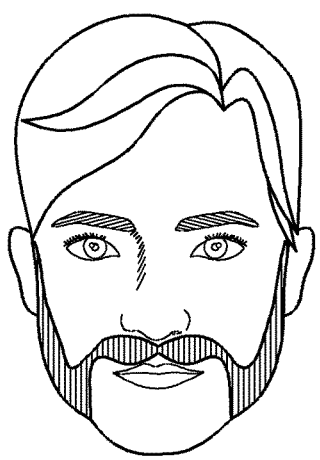
Figure 4:
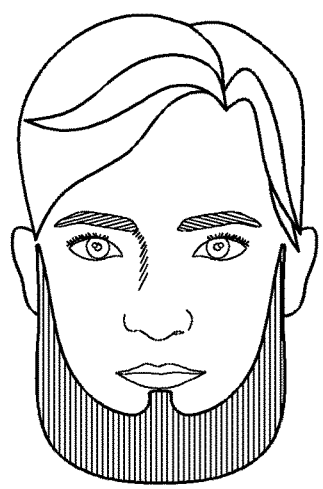
Figure 4:
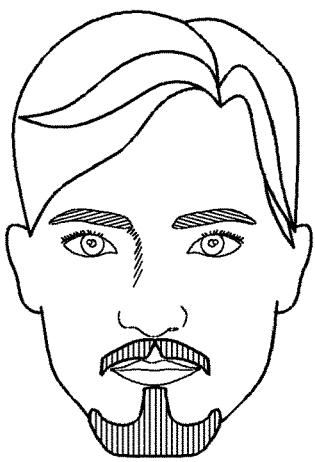

In an embodiment, the texture components are predefined or designed in the application/software, and are represented by 3D face meshes. In a word, for each texture component, the designer configures a 3D face mesh to present the facial texture on the surface of the 3D face template, so as to generate the 3D facial model based on texture components for the avatar. Reference is made to FIGS. 3-4, which are schematic diagrams of texture components according to an embodiment of the present disclosure. As shown in FIG. 3, the eyebrow texture includes high arch, bushy, thin, straight and soft arch, which could be seen as 3D face meshes. In FIG. 4, the facial hair texture includes goatee beard, sideburn beard, stubble, chin curtain, spade, mutton chops, Old Dutch and hipster, where each facial hair texture corresponds to a 3D face mesh.

Besides, the hair color includes black, brown, blond and gray. The morph target includes pointy nose, bulbous nose, turned-up tip nose and aquiline nose, and the hair type includes short, medium, long and bald.

In addition, based on the probabilities that the facial features belongs to the texture components, the 3D facial geometry generating device 10 selects texture component with the highest probability for generating 3D facial model. For example, there are 5 texture components for eyebrow, such as high arch, bushy, thin, straight, soft arch. With the DNN operation, the 3D facial geometry generating device 10 obtains the probability that the eyebrow of the face on the 2D image belonged to the high arch texture is 0.1, to the bushy texture is 0.9, and other textures is 0. Thus, the 3D facial geometry generating device 10 uses the 3D face mesh corresponding to the bushy texture along with the 3D facial template to generate the 3D facial model.

With such manner, the 3D facial geometry generating device 10 selects texture components for morph target, lip color, hair color, hair style, and beard according to probabilities calculated by the DNN operation, so as to generate 3D facial model with complete facial features (i.e. with facial shape and facial texture).

Figure 5:
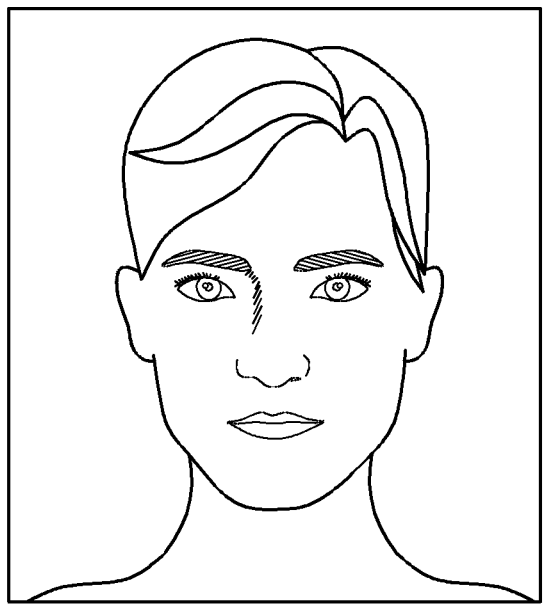
FIG. 5 is a schematic diagram of a 2D image according to an embodiment of the present disclosure.
Figure 6:
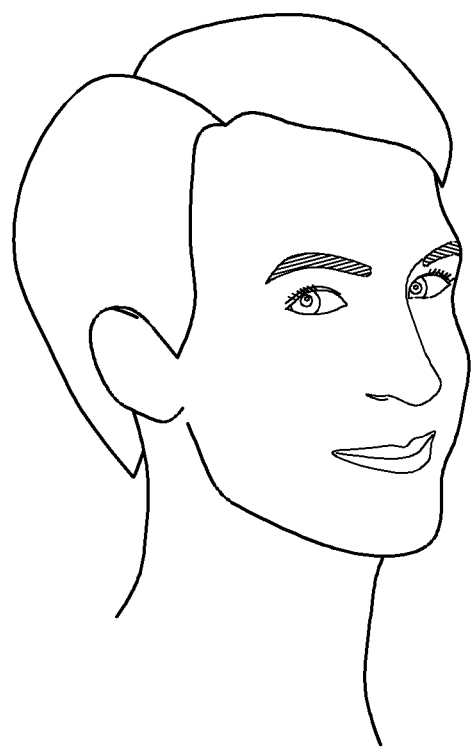
FIG. 6 is a schematic diagram of a 3D facial model according to an embodiment of the present disclosure.

In an embodiment, the DNN operation is applied on the 2D image shown in FIG. 5 to realize facial attributing prediction, where the DNN operation outputs labels for indicating whether the texture components are existed by probability. For example, label 1 indicates probability for the goatee beard is 0.8 and label 2 indicates probability for the sideburn beard is 0.1. Thus, the 3D facial geometry generating device 10 determines that the goatee beard will be presented on the 3D facial model. In a word, if there are five hair colors, five labels are used for indicating probabilities for the five hair colors. The same concept could be applied for morph target, hair style, lip color, eyebrows, eye bags etc., to determine the texture components that will be presented on the 3D facial model. Finally, with the above-mentioned labels for the texture components with highest probabilities, the 3D facial geometry generating device 10 generates 3D facial model as shown in FIG. 6.

The detailed operation for the DNN operation is as following.

1. Prepare training data (images with labeled facial features).
2. Define a loss function (i.e. a binary cross-entropy).
3. Feed training data into network and use optimizer to adjust parameters of network to minimize the output loss function.
4. Deploy the network for facial attributing prediction.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the 3D facial geometry generating device 10.

In conclusion, the present disclosure addresses to 3D facial reconstruction with DNN operation and landmark detection operation. In detail, based on the facial attributing prediction of the DNN operation, the probability for texture components corresponding to the facial features could be accurately determined, so as to create the highest-quality, most realistic 3D facial model. This method shows superior accuracy compared to the conventional methods.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of generating 3D facial geometry for an avatar, for a computing device, the method comprising:
    obtaining a 2D image;
    performing a landmark detection operation on the 2D image, to obtain at least a facial feature with landmarks;
    determining weightings for a plurality of classifications of the facial feature based on relative distances of the landmarks, wherein the plurality of classifications are predefined in the computing device;
    performing a deep neural network, DNN, operation on the 2D image, to classify each of facial features of the 2D image as texture components and obtain probabilities that the facial feature belong to the texture components, wherein the texture components are represented by 3D face mesh and are predefined in the computing device; and
    generating a 3D facial model based on a 3D face template predefined in the computing device with 3D parameters corresponding to the plurality of classifications of the facial feature, the corresponding weightings, and the texture component with the highest probability.

2. The method of claim 1, wherein the texture components comprise a lip color, eye bags, an eyebrow texture, a facial hair texture, a hair color, a hair style and a morph target.

3. The method of claim 2, wherein the eyebrow texture comprises high arch, bushy, thin, straight and soft arch, the facial hair texture comprises goatee beard, sideburn beard, stubble, chin curtain, spade, mutton chops, Old Dutch and hipster, hair color comprises black, brown, blond and gray, the morph target comprises pointy nose, bulbous nose, turned-up tip nose and aquiline nose, and the hair type comprises short, medium, long and bald.

4. The method of claim 1, wherein the facial features comprise a face shape, eyes, eyebrows, a nose and a mouth.

5. The method of claim 4, further comprising:
    determining at least a classification of the plurality of classifications of the facial feature according to the relative distance of the landmarks.

6. The method of claim 5, wherein determining the at least a classification of the plurality of classifications of the facial feature according to the relative distance of the landmarks comprises:
    determining a width and a length of the facial feature according to the relative distance of the landmarks, to obtain a ratio of the face feature; and
    determining the classification of the face feature according to the ratio.

7. The method of claim 1, wherein determining weightings for the plurality of classifications of the facial feature based on relative distances of the landmarks:
  determining a width and a length of the facial feature according to the relative distance of the landmarks, to obtain a ratio of the face feature; and
  determining weightings for the plurality of classifications of the facial feature according to the ratio.

8. An avatar simulation system comprising:
  a camera, for obtaining a 2D image;
  a computing device or a cloud, for generating 3D facial model;
  wherein the computing device or the cloud includes:
  a processing unit for executing a program; and
  a storage unit coupled to the processing unit for storing the program; wherein the program instructs the processing unit to perform the following steps:
    obtaining a 2D image;
    performing a landmark detection operation on the 2D image, to obtain at least a facial feature with landmarks;
    determining weightings for a plurality of classifications of the facial feature based on relative distances of the landmarks, wherein the plurality of classifications are predefined in the computing device;
    performing a deep neural network, DNN, operation on the 2D image, to classify each of facial features of the 2D image as texture components and obtain probabilities that the facial feature belong to the texture components, wherein the texture components are represented by 3D face mesh and are predefined in the computing device; and
    generating a 3D facial model based on a 3D face template predefined in the computing device with 3D parameters corresponding to the plurality of classifications of the facial feature, the corresponding weightings, and the texture component with the highest probability.

9. The avatar simulation system of claim 8, wherein the texture components comprise a lip color, eye bags, an eyebrow texture, a facial hair texture, a hair color, a hair style and a morph target.

10. The avatar simulation system of claim 9, wherein the eyebrow texture comprises high arch, bushy, thin, straight and soft arch, the facial hair texture comprises goatee beard, sideburn beard, stubble, chin curtain, spade, mutton chops, Old Dutch and hipster, hair color comprises black, brown, blond and gray, the morph target comprises pointy nose, bulbous nose, turned-up tip nose and aquiline nose, and the hair type comprises short, medium, long and bald.

11. The avatar simulation system of claim 8, wherein the facial features comprise a face shape, eyes, eyebrows, a nose and a mouth.

12. The avatar simulation system of claim 11, wherein the program further instructs the processing unit to perform the following steps:
  determining at least a classification of the plurality of classifications of the facial feature according to the relative distance of the landmarks.

13. The avatar simulation system of claim 12, wherein the program further instructs the processing unit to perform the following steps:
  determining a width and a length of the facial feature according to the relative distance of the landmarks, to obtain a ratio of the face feature; and
  determining the classification of the face feature according to the ratio.

14. The avatar simulation system of claim 8, wherein the program further instructs the processing unit to perform the following steps:
  determining a width and a length of the facial feature according to the relative distance of the landmarks, to obtain a ratio of the face feature; and
  determining weightings for the plurality of classifications of the facial feature according to the ratio.

15. A computing device for generating 3D facial geometry for an avatar comprising:
  a processing unit for executing a program; and
  a storage unit coupled to the processing unit for storing the program; wherein the program instructs the processing unit to perform the following steps:
    obtaining a 2D image;
    performing a landmark detection operation on the 2D image, to obtain at least a facial feature with landmarks;
    determining weightings for a plurality of classifications of the facial feature based on relative distances of the landmarks, wherein the plurality of classifications are predefined in the computing device;
    performing a deep neural network, DNN, operation on the 2D image, to classify each of facial features of the 2D image as texture components and obtain probabilities that the facial feature belong to the texture components, wherein the texture components are represented by 3D face mesh and are predefined in the computing device; and
    generating a 3D facial model based on a 3D face template predefined in the computing device with 3D parameters corresponding to the plurality of classifications of the facial feature, the corresponding weightings, and the texture component with the highest probability.

16. The computing device of claim 15, wherein the texture components comprise a lip color, eye bags, an eyebrow texture, a facial hair texture, a hair color, a hair style and a morph target.

17. The computing device of claim 16, wherein the eyebrow texture comprises high arch, bushy, thin, straight and soft arch, the facial hair texture comprises goatee beard, sideburn beard, stubble, chin curtain, spade, mutton chops, Old Dutch and hipster, hair color comprises black, brown, blond and gray, the morph target comprises pointy nose, bulbous nose, turned-up tip nose and aquiline nose, and the hair type comprises short, medium, long and bald.

18. The computing device of claim 15, wherein the facial features comprise a face shape, eyes, eyebrows, a nose and a mouth.

19. The computing device of claim 18, wherein the program further instructs the processing unit to perform the following steps:
  determining at least a classification of the plurality of classifications of the facial feature according to the relative distance of the landmarks.

20. The computing device of claim 19, wherein the program further instructs the processing unit to perform the following steps:
  determining a width and a length of the facial feature according to the relative distance of the landmarks, to obtain a ratio of the face feature; and
  determining the classification of the face feature according to the ratio.

21. The computing device of claim 15, wherein the program further instructs the processing unit to perform the following steps:

determining a width and a length of the facial feature according to the relative distance of the landmarks, to obtain a ratio of the face feature; and determining weightings for the plurality of classifications of the facial feature according to the ratio.

\* \* \* \* \*